United States Patent [19]

Muchel

[11] Patent Number: 4,863,249
[45] Date of Patent: Sep. 5, 1989

[54] CATADIOPTRIC OBJECTIVE SYSTEM FOR IMAGING A DIODE LINE

[75] Inventor: Franz Muchel, Königsbronn, Fed. Rep. of Germany

[73] Assignee: Carl-Zeiss Stiftung, Heidenheim/Brenz, Fed. Rep. of Germany

[21] Appl. No.: 198,983

[22] Filed: May 26, 1988

[30] Foreign Application Priority Data

May 27, 1987 [DE] Fed. Rep. of Germany ....... 3717905

[51] Int. Cl.$^4$ .......................... G02B 17/00; H01J 3/16
[52] U.S. Cl. ..................................... 350/443; 250/216
[58] Field of Search ............... 350/442, 443, 444, 445; 250/216

[56] References Cited

U.S. PATENT DOCUMENTS 4,507,551  3/1985  Howard et al. ................ 350/443 X
4,768,869  9/1988  Mercado ......................... 350/442 X Primary Examiner—Scott J. Sugarman
Attorney, Agent, or Firm—Stonebraker, Shepard & Stephens

[57] ABSTRACT

For the imaging of a diode line, a catadioptric objective system is provided. The diode line to be imaged is located between a concave mirror of exactly or approximately spherical shape (possibly with aspherical correction deviating from the theoretical shperical shape) and an objective, usually comprising a plurality of members. One or more surfaces of the objective may be aspherical. The concave mirror produces a reduced image of the diode line on the front focus of the objective.

3 Claims, 1 Drawing Sheet

CATADIOPTRIC OBJECTIVE SYSTEM FOR IMAGING A DIODE LINE

The present invention relates to a catadioptric objective system.

An object of the invention is to provide a compact and inexpensive optical system especially suitable and satisfactory for imaging a diode line with high aperture.

SUMMARY OF THE INVENTION

According to the invention, the above mentioned object is achieved by arranging the diode line between a concave mirror and an objective. Since the concave mirror focuses the diode line on infinity, a reduced image of the diode line is produced on the front focus of the objective.

In one suitable embodiment of the invention, the concave mirror is a spherical mirror and the entrance pupil of the objective lies at the center of the sphere of the mirror. In this way, there is obtained a coma-free and astigmatism-free imaging of the diode line by the mirror. Since a concave mirror produces a positive field curvature, it compensates for the greatest part of the negative field curvature of the objective.

Advantageously, the objective contains at least one aspherical surface.

It is also possible to develop the mirror surface aspherically. When this is done, it is still possible to describe the mirror surface as "substantially" or "approximately" spherical, since the aspherical surface only slightly departs from or modifies the theoretical spherical surface.

Among the advantages of the invention is, especially, the fact that it permits a considerable reduction in the number of lenses for the image-forming system, and that a compact structural length of the image-forming system is achieved, due to the interlaced optical path.

According to the invention, the numerical aperture of the optical system is 0.3 at the position of the diode line with a field diameter of 2.4 mm, and is 0.6 at the position conjugated to the diode line with a field diameter of 1.2 mm.

BRIEF DESCRIPTION OF THE DRAWINGS

In the accompanying drawings, which show one illustrative embodiment of the invention.

DETAILED DESCRIPTION

Figure 1:
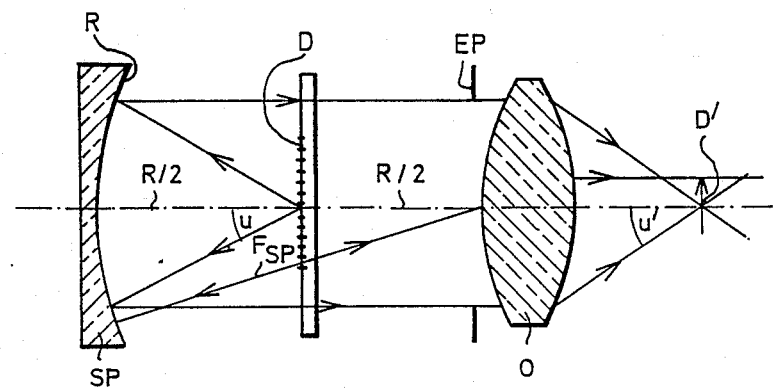
FIG. 1 is a diagram of the objective system of the invention.

Referring now to FIG. 1, there is shown a catadioptric system including a concave mirror SP having a curved reflecting surface with radius R. The diode line is arranged between this concave mirror and an objective O, here shown schematically as a single element but actually usually composed of a plurality of elements or members.

The entrance pupil EP of the objective is concentric with the center point of the sphere of the concave mirror SP. If the mirror has an aspherical surface, the reference to the sphere of the mirror means the theoretical sphere to which the aspherical modifications or variations are applied. The principal ray Fsp also passes through the center point of the sphere. The concave mirror SP focuses the diode line D on infinity. In the front focus of the objective there is produced an image D' of the diode line of reduced size. The concave mirror SP provides a coma-free and astigmatism-free image and, as a collecting mirror, has a positive field curvature. This positive field curvature compensates for the most part of the negative field curvature of the objective, as a result of which the number of lens elements or components required for a satisfactory objective is considerably reduced.

The numerical aperture is designated u at the location of the diode line, and is designated u' at the place conjugated with respect thereto.

Figure 2:
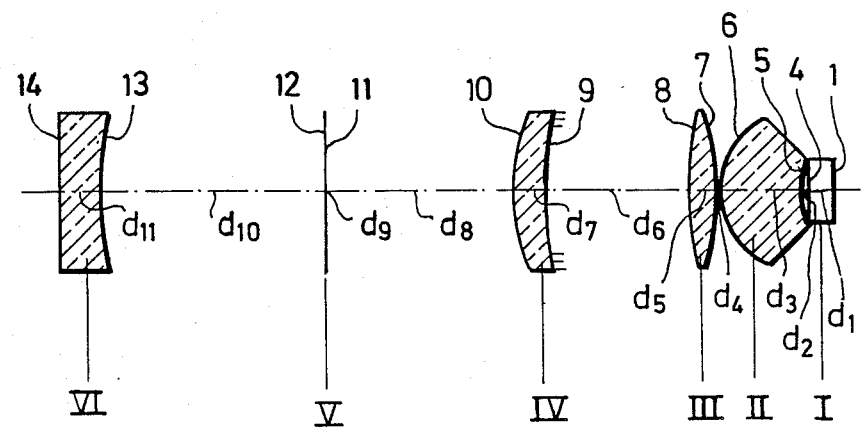
FIG. 2 is a schematic axial sectional view through the elements of an embodiment.

FIG. 2 shows a diametrical section taken longitudinally through a preferred embodiment of the invention. The numerical values are given in the following table, with data presented according to customary usage in lens patents and other optical literature. Values for radii, thicknesses, and spacings are given in mm. The length of the diode line is 2.4 mm, and the linear magnification is ½. The designations of material refer to the designations used in the well-known Schott catalog for optical glass. The optical elements are numbered consecutively in roman numerals from I to VI. Surfaces are numbered consecutively in arabic numerals. Both thicknesses and spacings are designated d and are numbered in a single series of arabic numerals.

Preferably at least one aspherical surface is present in the system. Conveniently, this is the surface 9 of the element IV, and an equation for this surface is included in the table. However, in place of or in addition to an aspherical surface at 9 on element IV, a corrective aspherical surface may be applied to any appropriate surface of the objective or to the reflecting surface 13 of the mirror element VI. When a figure is given for the radius of an aspherical surface, this means the radius of the theoretical sphere from which the aspherical surface departs.

| Element | Radius (mm) | Thickness or spacing (mm) | Material (Schott catalog) |
|---|---|---|---|
| I | r1 ∞ | | F6 |
|   |       | d1 = 3.2 | |
|   | r4 ∞ | | |
|   |       | d2 = 0.720 | |
| II | r5 = −10.6690 | | SK 11 |
|    |               | d3 = 10.00 | |
|    | r6 = −8.78520 | | |
|    |               | d4 = 0.100 | |
|    | r7 = 27.1888 | | |
| III |              | d5 = 3.000 | SK 11 |
|     | r8 = −41.8670 | | |
|     |               | d6 = 18.25 | |
|     | r9 = −69.2830 (aspheric) | | |
| IV  |               | d7 = 3.500 | PMMA (Plexiglas ®) |
|     | r10 = −25.3000 | | |
|     |               | d8 = 23.50 | |
| V | Diode line | d9 = 0.150 | K5 |
|   |            | d10 = 28.52 | |
|   | r13 = −57.0490 | | |
| VI |             | | |
|    | r14 ∞ | | | and the aspheric surface on element IV is substantially in accordance with the following equation:

$$P = \frac{h^2}{2r} + C_1 h^4 + C_2 h^6 + C_3 h^8 + C_4 h^{10}$$

in which:

$C_1 = -0.259 \times 10^{-4}$ $C_2 = -0.4506 \times 10^{-7}$ $C_3 = -0.1171 \times 10^{-9}$ $C_4 = -0.1282 \times 10^{-11}$

What is claimed is:

1. A catadioptric objective system for imaging a diode line, comprising a concave mirror (SP), an objective (O), and a diode line (D) arranged between said mirror and said objective, said optical system being of substantially the materials and of a size substantially proportional to the linear dimensions given in the following table:

| Element | Radius (mm) | Thickness or spacing (mm) | Material (Schott catalog) |
|---|---|---|---|
| I | r1 = ∞ | | F6 |
| | | d1 = 3.2 | |
| | r4 = ∞ | | |
| | | d2 = 0.720 | |
| | r5 = −10.6690 | | |
| II | | d3 = 10.00 | SK 11 |
| | r6 = −8.78520 | | |
| | | d4 = 0.100 | |
| | r7 = 27.1888 | | |
| III | | d5 = 3.000 | SK11 |
| | r8 = −41.8670 | | |
| | | d6 = 18.25 | |
| | r9 = −69.2830 | | |
| IV | | d7 = 3.500 | PMMA (Plexiglass) ® |
| | r10 = −25.3000 | | |
| | | d8 = 23.50 | |
| V | Diode line | d9 = 0.150 | K5 |
| | | d10 = 28.52 | |
| | r13 = −57.0490 | | |
| VI | r14 = ∞ | | |

2. The invention defined in claim 1, wherein said surface r9 on said element IV is an aspherical surface formed substantially in accordance with the equation $$P = \frac{h^2}{2_r} + C_1 h^4 + C_2 h^6 + C_3 h^8 + C_4 h^{10}$$

in which:

$C_1 = -0.259 \times 10^{-4}$ $C_2 = -0.4506 \times 10^{-7}$ $C_3 = -0.1171 \times 10^{-9}$ $C_4 = -0.1282 \times 10^{-11}$ 3. A catadioptric objective system for imaging a diode line, comprising an objective (elements I–IV), a concave mirror (element VI), and a diode line (element V) arranged between said objective and said mirror, said elements being constructed and arranged substantially in accordance with the following data:

| Element | Radius (mm) | Thickness or spacing (mm) | Material (Schott catalog |
|---|---|---|---|
| I | r1 = ∞ | | F6 |
| | | d1 = 3.2 | |
| | r4 = ∞ | | |
| | | d2 = 0.720 | |
| | r5 = −10.6690 | | |
| II | | d3 = 10.00 | SK 11 |
| | r6 = −8.78520 | | |
| | | d4 = 0.100 | |
| | r7 = 27.1888 | | |
| III | | d5 = 3.000 | SK11 |
| | r8 = −41.8670 | | |
| | | d6 = 18.25 | |
| | r9 = −69.2830 (aspheric) | | |
| IV | | d7 = 3.500 | PMMA (Plexiglas ®) |
| | r10 = −25.3000 | | |
| | | d8 = 23.50 | |
| V | Diode line | d9 = 0.150 | K5 |
| | | d10 = 28.52 | |
| | r13 = −57.0490 | | |
| VI | r14 = ∞ | | | said aspheric surface on element IV being substantially in accordance with the equation $$P = \frac{h^2}{2_r} + C_1 h^4 + C_2 h^6 + C_3 h^8 + C_4 h^{10}$$

in which:

$C_1 = -0.259 \times 10^{-4}$ $C_2 = -0.4506 \times 10^{-7}$ $C_3 = -0.1171 \times 10^{-9}$ $C_4 = -0.1282 \times 10^{-11}$

* * * * *